(12) United States Patent
Bergeron et al.

(10) Patent No.: US 11,814,804 B2
(45) Date of Patent: Nov. 14, 2023

(54) SYSTEM FOR REMOVING POLYMER PELLETS AND OTHER CONTAMINANTS FROM WATER RESERVOIRS

(71) Applicant: Chevron Phillips Chemical Company LP, The Woodlands, TX (US)

(72) Inventors: Gerald P. Bergeron, Port Neches, TX (US); Amy E. Hudson, Atascocita, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/539,283

(22) Filed: Dec. 1, 2021

(65) Prior Publication Data
US 2023/0167619 A1 Jun. 1, 2023

(51) Int. Cl.
*B01D 33/15* (2006.01)
*E02B 15/10* (2006.01)
(Continued)

(52) U.S. Cl.
CPC .............. *E02B 15/10* (2013.01); *B01D 33/15* (2013.01); *C02F 1/001* (2013.01); *C02F 1/40* (2013.01);
(Continued)

(58) Field of Classification Search
CPC ..... E02B 15/10; E02B 15/106; E04H 4/1263; B01D 35/05; B01D 33/15; C02F 1/001;
(Continued)

(56) References Cited

U.S. PATENT DOCUMENTS 2,330,508 A * 9/1943 McColl ................. E02B 15/106
210/242.3
3,656,623 A 4/1972 Quase
(Continued)

FOREIGN PATENT DOCUMENTS

GB 1331422 A 9/1973

OTHER PUBLICATIONS

Bergeron, Richter; Virtual Lunch Presentation, American Fuel & Petrochemical Manufacturers 2021 National Occupational & Process Safety Conference & Exhibition, New Orleans and Virtual, Aug. 24, 2021.
(Continued)

*Primary Examiner* — Joseph W Drodge
(74) *Attorney, Agent, or Firm* — Merchant & Gould P.C.

(57) ABSTRACT

Systems for removing debris from a water reservoir include a moveable floating skimmer device positioned within the water reservoir and configured to receive floating debris, the skimmer device comprising an adjustable weir for capturing the debris and a receptacle for containing the debris; a discharge pipe connected to the skimmer device, the discharge pipe configured to receive the debris and a first portion of water from the receptacle in the skimmer device; a debris separator fluidly connected to the discharge pipe and configured to receive the debris and the first portion of water from the discharge pipe, the debris separator further configured to separate the debris from the first portion of water; a pump positioned between the discharge pipe and the debris separator and configured to transport the debris and the first portion of water in the discharge pipe to the debris separator via a pump outlet; and a recycle line connected to the debris separator and configured to return a second portion of water that exits the debris separator back to the water reservoir.

20 Claims, 4 Drawing Sheets

(51) Int. Cl.
  *C02F 1/00* (2023.01)
  *C02F 1/40* (2023.01)
  *C02F 101/30* (2006.01)
  *C02F 103/00* (2006.01)

(52) U.S. Cl.
  CPC .... *C02F 2001/007* (2013.01); *C02F 2101/30* (2013.01); *C02F 2103/001* (2013.01); *C02F 2103/007* (2013.01); *C02F 2301/046* (2013.01); *C02F 2303/16* (2013.01)

(58) Field of Classification Search
  CPC .. C02F 1/40; C02F 2001/007; C02F 2101/30; C02F 2103/001; C02F 2103/007; C02F 2301/046; C02F 2303/16; C02F 2201/002; C02F 2201/008; C02F 2303/24
  USPC ........ 210/122, 167.1, 167.2, 170.05, 170.09, 210/242.1, 747.6, 776
  See application file for complete search history.

(56) References Cited

U.S. PATENT DOCUMENTS

| | | | | |
|---|---|---|---|---|
| 3,922,225 A * | 11/1975 | Strain | ............... | E02B 15/106 210/242.3 |
| 3,983,034 A * | 9/1976 | Wilson | ............... | E02B 15/048 210/776 |
| 4,101,175 A | 7/1978 | Kull | | |
| 4,882,073 A * | 11/1989 | Griffith | ............... | E02B 15/00 210/242.1 |
| 5,006,239 A * | 4/1991 | Mishra | ............... | B01D 17/02 210/512.1 |
| 5,108,591 A * | 4/1992 | Hagan | ............... | E02B 15/106 210/122 |
| 5,259,829 A * | 11/1993 | VanEgmond | ............... | F04D 7/045 494/56 |
| 5,308,510 A * | 5/1994 | Gore | ............... | E02B 15/048 210/776 |
| 5,433,229 A * | 7/1995 | Blair | ............... | B08B 3/022 134/201 |
| 5,893,978 A * | 4/1999 | Yoda | ............... | C02F 7/00 210/170.05 |
| 5,904,843 A * | 5/1999 | Herbst | ............... | B01D 29/01 210/170.09 |
| 5,948,266 A | 9/1999 | Gore | | |
| 6,041,453 A | 3/2000 | Barrow | | |
| 6,251,286 B1 | 6/2001 | Gore | | |
| 7,285,211 B2 * | 10/2007 | Brody | ............... | B01D 21/0012 210/538 |
| 9,668,461 B1 | 6/2017 | Triplett | | |
| 10,155,670 B1 | 12/2018 | Happel | | |
| 2004/0226896 A1 | 11/2004 | Lovestead | | |
| 2015/0247332 A1* | 9/2015 | Norberto, III | ............... | E04H 4/1263 210/167.2 |
| 2015/0272453 A1* | 10/2015 | Heberlein | ............... | A61B 5/0263 600/419 |
| 2016/0010300 A1* | 1/2016 | Pizzi | ............... | E02B 15/104 210/396 |
| 2019/0338481 A1* | 11/2019 | Covington | ............... | E02B 15/048 |

OTHER PUBLICATIONS

International Search Report and Written Opinion issued in application No. PCT/US2022/080741 dated Apr. 12, 2023, 16 pp.

* cited by examiner

SYSTEM FOR REMOVING POLYMER PELLETS AND OTHER CONTAMINANTS FROM WATER RESERVOIRS

FIELD OF THE INVENTION

The present disclosure relates to systems and devices for removing waste and debris from bodies of water, and more particularly, relates to such systems and devices in which polymer resin pellets are removed from contained water reservoirs.

BACKGROUND OF THE INVENTION

Water and stormwater from areas where polymer resin pellets can be found are collected into basins where bucket conveyers can convey the pellets into disposal containers. The water in these basins finds its way to ponds on the site with weirs and screens keeping the pellets in the basins. The ponds eventually drain to waterways and usually have booms, weirs, and screens to keep the pellets from entering the waterways. However, in an extreme rain event, the water often overwhelms this system and can push pellets over the weirs and screens and into the waterways. Also, flood waters can wash pellets out of the ponds. There is a need to keep the number of polymer resin pellets in the system as low as possible, such the zero pellet loss can be achieved. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Systems for removing debris from a water reservoir are disclosed and described herein. One such system can comprise (a) a moveable floating skimmer device positioned within the water reservoir and configured to receive floating debris, the skimmer device comprising an adjustable weir for capturing the debris and a receptacle for containing the debris, (b) a discharge pipe connected to the skimmer device, the discharge pipe configured to receive the debris and a first portion of water from the receptacle in the skimmer device, (c) a debris separator fluidly connected to the discharge pipe and configured to receive the debris and the first portion of water from the discharge pipe, the debris separator further configured to separate the debris from the first portion of water, (d) a pump positioned between the discharge pipe and the debris separator and configured to transport the debris and the first portion of water in the discharge pipe to the debris separator via a pump outlet, and (e) a recycle line connected to the debris separator and configured to return a second portion of water that exits the debris separator back to the water reservoir.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description.

Figure 1:
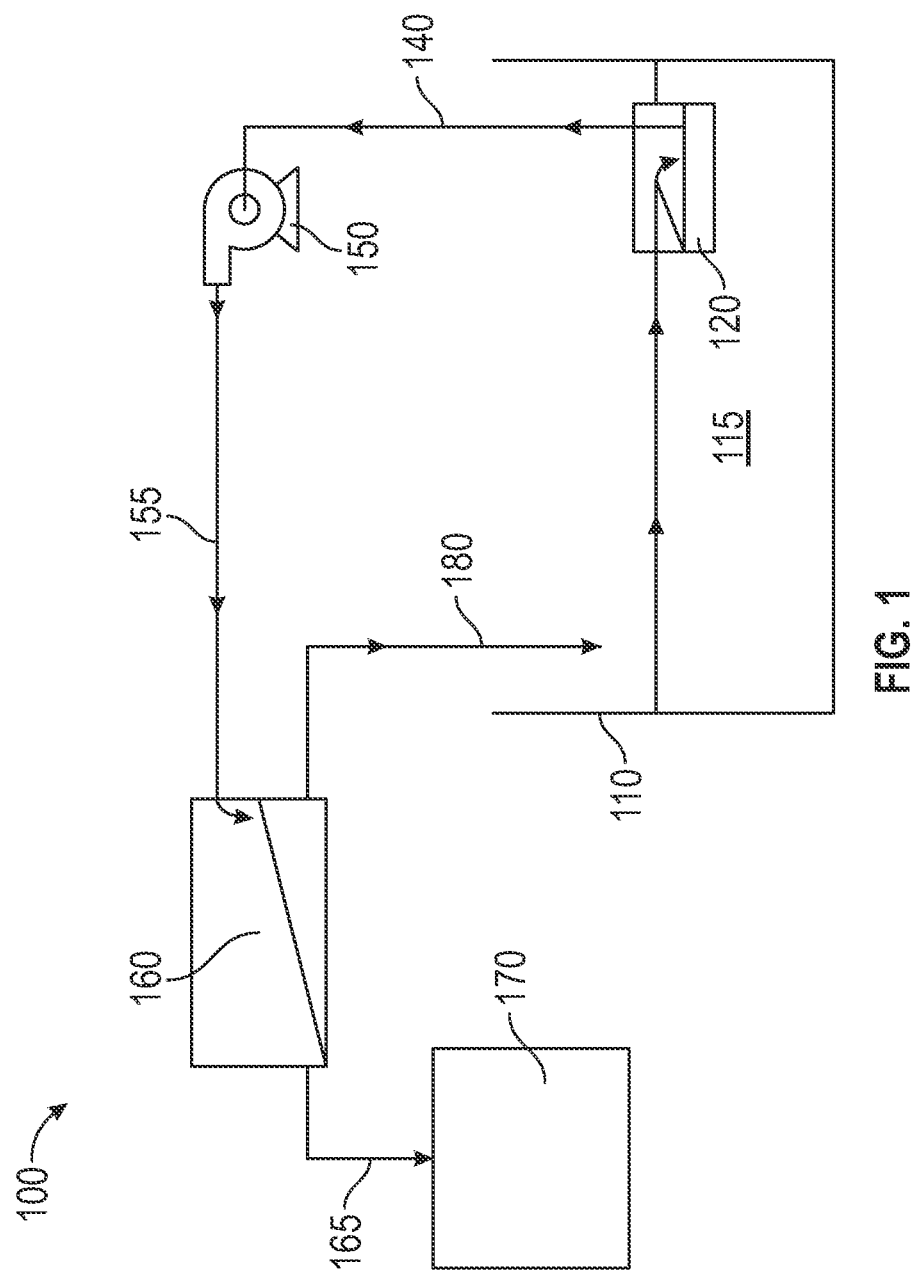
FIG. 1 is a schematic flow diagram of a system for removing debris from a water reservoir in accordance with an aspect of the present invention.

While the inventions disclosed herein are susceptible to various modifications and alternative forms, only a few specific aspects have been shown by way of example in the drawings and described in detail below. The figures and detailed descriptions of these specific aspects are not intended to limit the breadth or scope of the inventive concepts or the appended claims in any manner. Rather, the figures and detailed descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the systems, compositions, devices, or methods described herein are contemplated with or without explicit description of the particular combination. Additionally, unless explicitly recited otherwise, any aspect or feature disclosed herein can be combined to describe inventive systems, compositions, devices, or methods consistent with the present disclosure.

The term "polymer" is used herein generically to encompass any synthetic polymeric material that can float on water, and particularly includes polyolefins such as ethylene polymers (e.g., ethylene homopolymers, ethylene copolymers, ethylene terpolymers, and the like, as well as blends or mixtures thereof); propylene-based polymers (e.g., polypropylene homopolymer and propylene-based copolymers, and the like, as well as blends or mixtures thereof); styrene-based polymers (e.g., polystyrene homopolymer and styrene-based copolymers, and the like, as well as blends or mixtures thereof); amine-based copolymers (e.g., polyamides, and the like, as well as blends or mixtures thereof);

and carboxylic acid based copolymers (e.g., polyesters including poly(ethylene terephthalate), and the like, as well as blends or mixtures thereof). The ethylene polymer encompasses polymers often referred to in the art as LDPE (low density polyethylene), LLDPE (linear low density polyethylene), and HDPE (high density polyethylene), among others.

In this disclosure, while systems and methods are described in terms of "comprising" various components or steps, the systems and methods also can "consist essentially of" or "consist of" the various components or steps, unless stated otherwise. The terms "a," "an," and "the" are intended to include plural alternatives, e.g., at least one, unless otherwise specified.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the water recirculation rate can be in certain ranges. By a disclosure that the water recirculation rate can be in a range from 25 to 250 gpm (gallons/min), the intent is to recite that the water recirculation rate can be any water recirculation rate in the range and, for example, can include any range or combination of ranges from 25 to 250 gpm, such as from 50 to 200 gpm, or from 120 to 200 gpm, and so forth. Likewise, all other ranges disclosed herein should be interpreted in a manner similar to this example.

In general, an amount, size, formulation, parameter, range, or other quantity or characteristic is "about" or "approximately" whether or not expressly stated to be such. Whether or not modified by the term "about" or "approximately," the claims include equivalents to the quantities or characteristics.

Although any methods, systems, steps, and components similar or equivalent to those described herein can be used in the practice or testing of the invention, the typical methods, systems, steps, and components are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Systems for removing debris—in particular, polymer resin pellets—from water reservoirs are disclosed and described herein. An objective of this system is to remove as many polymer resin pellets (and other types of debris) as possible from the water reservoir, such that when an extreme rain or flood water event impacts the water reservoir, there are no polymer resin pellets in the water reservoir that can leave the reservoir and reach a public waterway.

Debris Removal Systems

Systems configured to remove debris from a water reservoir can comprise (or consist essentially of, or consist of) (a) a moveable floating skimmer device positioned within the water reservoir and configured to receive floating debris, the skimmer device comprising an adjustable weir for capturing the debris and a receptacle for containing the debris, (b) a discharge pipe connected to the skimmer device, the discharge pipe configured to receive the debris and a first portion of water from the receptacle in the skimmer device, (c) a debris separator fluidly connected to the discharge pipe and configured to receive the debris and the first portion of water from the discharge pipe, the debris separator further configured to separate the debris from the first portion of water, (d) a pump positioned between the discharge pipe and the debris separator and configured to transport the debris and the first portion of water in the discharge pipe to the debris separator via a pump outlet, and (e) a recycle line connected to the debris separator and configured to return a second portion of water that exits the debris separator back to the water reservoir.

The system for removing debris from the water reservoir can be configured to operate continuously, particularly if a significant amount of debris is present in the reservoir, and/or debris is constantly entering the water reservoir. Alternatively, the system for removing debris from the water reservoir can be configured to operate on a periodic or intermittent basis.

Referring first to the moveable floating skimmer device, the floating skimmer device is positioned within the water reservoir and is configured to receive floating debris. The skimmer device has an adjustable weir for capturing the debris, which is generally floating on the surface of the water, and has receptacle for containing the debris. Therefore, the skimmer device is configured to float at or near the surface of the water in the reservoir. The type of debris that the skimmer device is well suited for capturing/containing is not particularly limited, and can include polymer resin pellets, polymer trash, floating organic waste, and the like, as well as combinations thereof. Polymer trash can include various non-pellet polymer forms, such as polymer flake, fluff, fines, strings, tails, rope, and the like. Floating organic waste includes leaves, grass, and the like.

The water reservoir in which the debris is collected can be any suitable contained water source, non-limiting examples of which include a collection pit, a water retention pond or basin, a stormwater reservoir, and the like. Typically, the water reservoir is not a body of water that may contain fish, such as a lake, a pond, a river, and so forth.

The movement of the skimmer device within the water reservoir generally is controlled by a plurality of tethering lines. The tethering lines are connected to any suitable part of the skimmer device. The number of tethering lines can be 2 tethering lines, 3 tethering lines, 4 tethering lines, or more, depending upon the size of the water reservoir and the environmental conditions (e.g., wind conditions).

It can be advantageous for the system and the skimmer device to have a screen that surrounds at least a portion of the skimmer device. The purpose of the screen is to prevent large debris from entering the skimmer device, so that the skimmer device is more effective at capturing smaller floating debris, such as polymer resin pellets. The size of the openings in the screen is not particularly limited, although a screen with an average diameter of screen openings from 0.25 to 2 inches, or from 0.5 to 1.5 inches, is typical. Thus, with the screen surrounding at least a portion of the skimmer device, the debris (e.g., smaller debris) and water within the water reservoir can flow through the screen and over the adjustable weir to the receptacle in the skimmer device.

Attached to the skimmer device is a discharge pipe, which is configured to receive the debris and a first portion of water from the receptacle in the skimmer device. The inlet of the discharge pipe can be positioned at any location proximate to the receptacle area in which the debris is collected and contained. In one aspect, for instance, the inlet of the discharge pipe is positioned at a rear section of the skimmer device (the front being where the screen and adjustable weir are often located) and fluidly connected to the receptacle in the skimmer device, and in another aspect, the inlet of the discharge pipe is positioned at a top section of the skimmer device and fluidly connected to the receptacle in the skimmer device. If desired, the system can be configured with more than one discharge pipe connected to the skimmer device at different locations.

A debris separator is fluidly connected to the discharge pipe and configured to receive the debris and the first portion of water from the discharge pipe, and the debris separator is further configured to separate the debris from the first portion of water. A pump is positioned between the discharge pipe and the debris separator, and the pump is configured to transport the debris and the first portion of water in the discharge pipe to the debris separator via a pump outlet. The pump can be designed for (and the system can be configured for) any suitable water recirculation rate, such as from 25 to 250 gpm (gallons/min), from 50 to 200 gpm, from 120 to 200 gpm, or from 140 to 180 gpm, and the like. This water recirculation rate can be dependent upon many factors, such as the amount of debris in the water reservoir and the capacity of the debris separator.

Referring now to the debris separator, any suitable device that sufficiently separates the debris from the first portion of water can be used as the debris separator. Separation of the debris from the first portion of water can be accomplished using gravity (e.g., the debris separator can be on an elevated structure, and water is removed via gravity), using movement/rotation, or a combination of two or more different techniques. Non-limiting examples of debris separator devices that function to separate the debris from the first portion of water include a rotary screen, a dewatering box, a sieve/screen system (a hydrosieve), and the like, as well as combinations thereof.

Attached to the debris separator is a recycle line, which is configured to return a second portion of water that exits the debris separator back to the water reservoir. Thus, the debris separator isolates the debris from the first portion of water, and the separated water (termed the second portion of water) can be returned or recycled to the water reservoir via the recycle line. It is possible for the second portion of water to be equivalent to the first portion of water, if all of the water that enters the debris separator also exits the debris separator. Generally, however, there are some water losses, although minimal, in the debris separator; for example, water entrained with the debris, water entrained in the screens of the debris separator, and so forth. Further, it is not required for all of the water that exits the debris separator to be returned to the water reservoir. In an aspect, the system for removing debris from the water reservoir can be further configured for the second portion of water in the recycle line, that is returned to the water reservoir, to propel floating debris towards and into the skimmer device. For instance, the discharge from the recycle line can be oriented such that water/debris in the reservoir is propelled towards the skimmer device.

As above, it is not required for all of the water exiting the debris separator to be recycled into the water reservoir. For instance, the debris removal system can further contain a rinse system, which can be configured to rinse debris—polymer pellets and other debris—into the water reservoir using some or all of the second portion of water exiting the debris separator. Alternatively, a separate discharge from the debris separator (other than the recycle line) can provide water for use in the rinse system.

In another example, the debris removal system can further comprise a cleaning system, which can be configured to clean screens at a discharge from the water reservoir using some or all of the second portion of the water exiting the debris separator. Alternatively, a separate discharge from the debris separator can provide water for use in the cleaning system.

Optionally, the debris removal system also can further include a wash pump configured to pressurize some or all of the second portion of water exiting the debris separator (or alternatively, pressurize water from a separate discharge from the debris separator), for example, to create a wash system. This higher pressure water from the wash system can be used in the rinse system and/or the cleaning system. The wash pump can be operated continuously or intermittently, depending upon demand. Typical output pressures from the wash pump include from 2 to 50 psig or from 5 to 20 psig, although not limited thereto.

Referring now to FIG. 1, a representative system 100 for removing debris from a water reservoir 110 consistent with an aspect of the present invention is illustrated. The system 100 includes a moveable floating skimmer device 120, a discharge pipe 140, a pump 150, a debris separator 160, and a recycle line 180. The skimmer device 120 floats at the surface of water 115 in the reservoir 110. The surface of the water, which contains floating debris, is identified by the arrows in FIG. 1 leading into the skimmer device 120.

The discharge pipe 140 is connected to the skimmer device 120, and receives water and debris from the skimmer device 120, and the water and debris are delivered to the debris separator 160, which is fluidly connected to the discharge pipe. The pump 150 is positioned in between and connected to the discharge pipe 140 and the debris separator 160. The pump 150 transports water and debris in the discharge pipe 140 to the debris separator 160 via a pump outlet 155.

In the debris separator 160, the debris and water are separated, and in FIG. 1, the debris is discharged from the debris separator 160 via a debris outlet 165 and is stored in a debris bin 170. Water exits the debris separator 160 in a recycle line 180 and is returned to the reservoir 110. Examples include rotary screens which separate the debris, move the debris to the debris bin, and discharge the water.

Figure 2:
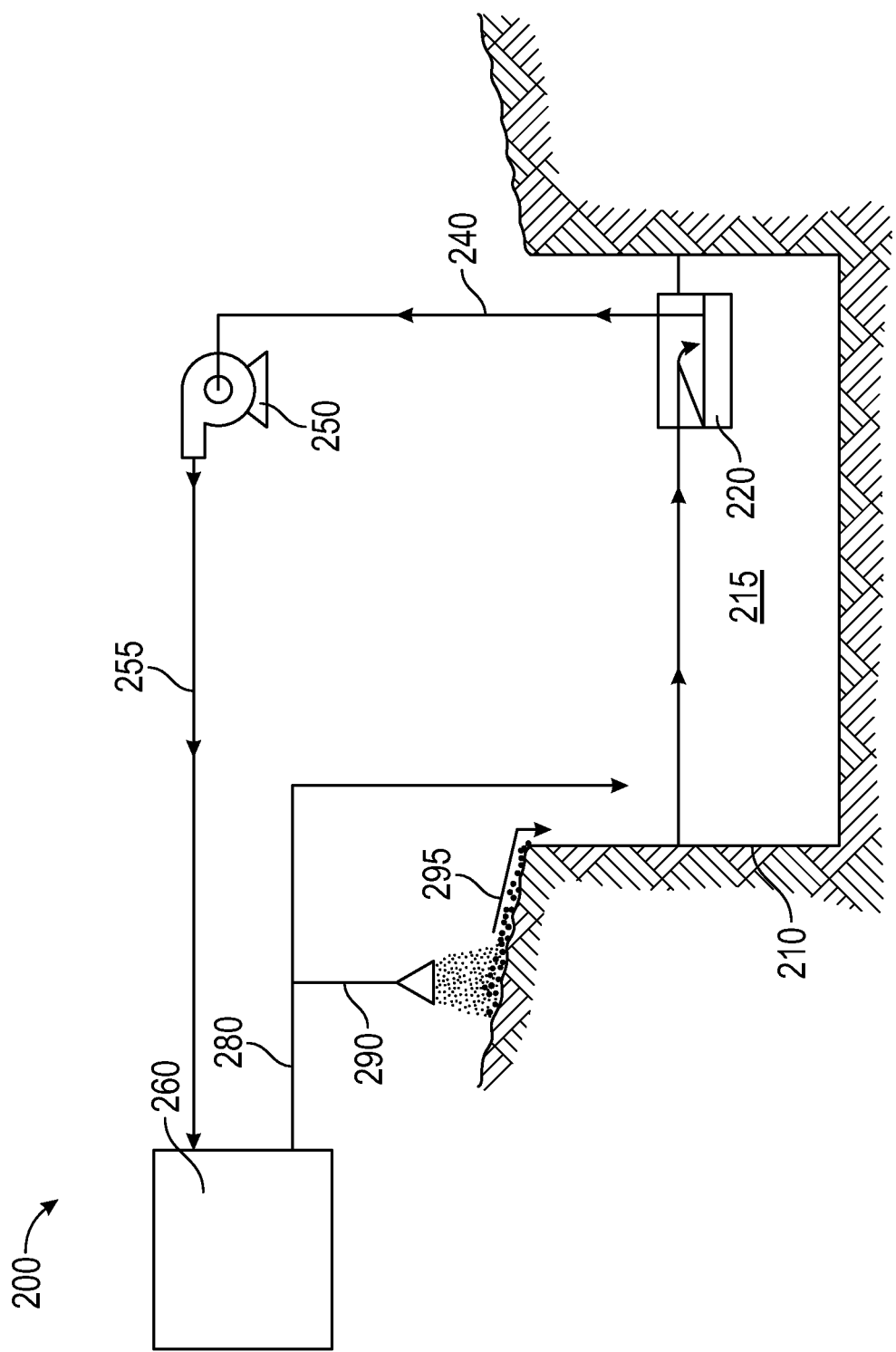
FIG. 2 is a schematic flow diagram of a system for removing debris from a water reservoir in accordance with another aspect of the present invention.

FIG. 2 illustrates a system 200 for removing debris from a water reservoir 210 consistent with another aspect of the present invention. The system 200 includes a moveable floating skimmer device 220, a discharge pipe 240, a pump 250, a debris separator 260, and a recycle line 280, which are generally the same as described for the similarly numbered components in FIG. 1. The skimmer device 220 floating at the surface of water 215 in the reservoir 210 and the pump outlet 255 between the pump 250 and the debris separator 260 in FIG. 2 also are generally the same as described for the similarly numbered components in FIG. 1. The debris separator 260 in FIG. 2 retains the debris that is separated from the water, unlike in FIG. 1. Examples include dewatering boxes, which retain the debris and discharge the water.

Water exits the debris separator 260 in FIG. 2 in recycle line 280 and a portion of the water is returned directly to the reservoir 210. Another portion of the water enters a rinse system 290, which is configured to rinse debris 295, such as polymer pellets, from the surrounding area into the water reservoir 210.

Figure 3:
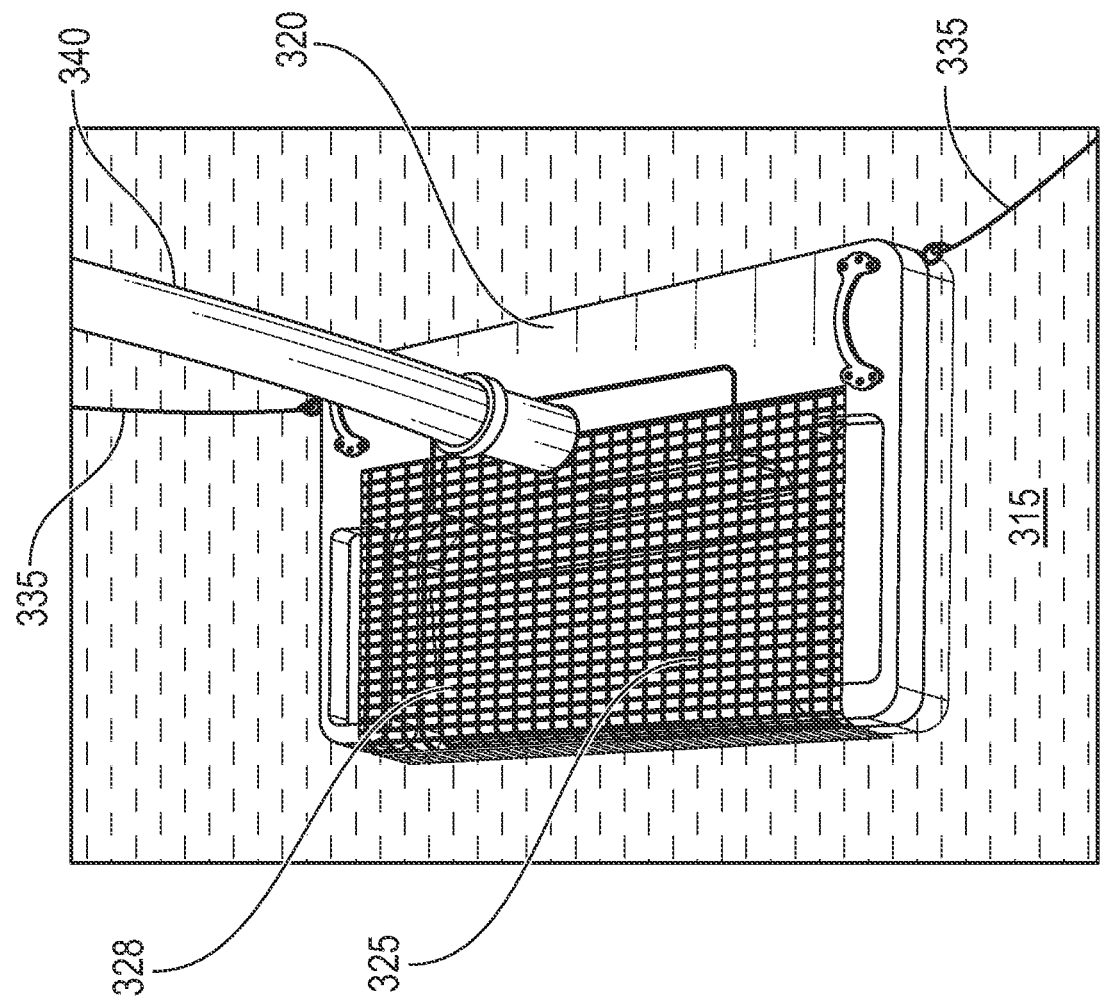
FIG. 3 is a top view of a skimmer device that can be used in the systems of FIGS. 1-2.

In FIG. 3, a top view of skimmer device 320 floating on the surface of water 315 is illustrated. Two tethering lines 335 are attached to the skimmer device 320 to control its movement in the water reservoir. At a front end (or inlet) of the skimmer device is an adjustable weir 325 and a screen 328, which is designed to prevent large debris from entering the skimmer device 320. A discharge pipe 340 in FIG. 3 is connected to the top of the skimmer device 320, and the discharge pipe receives debris and water from within the skimmer device.

Figure 4:
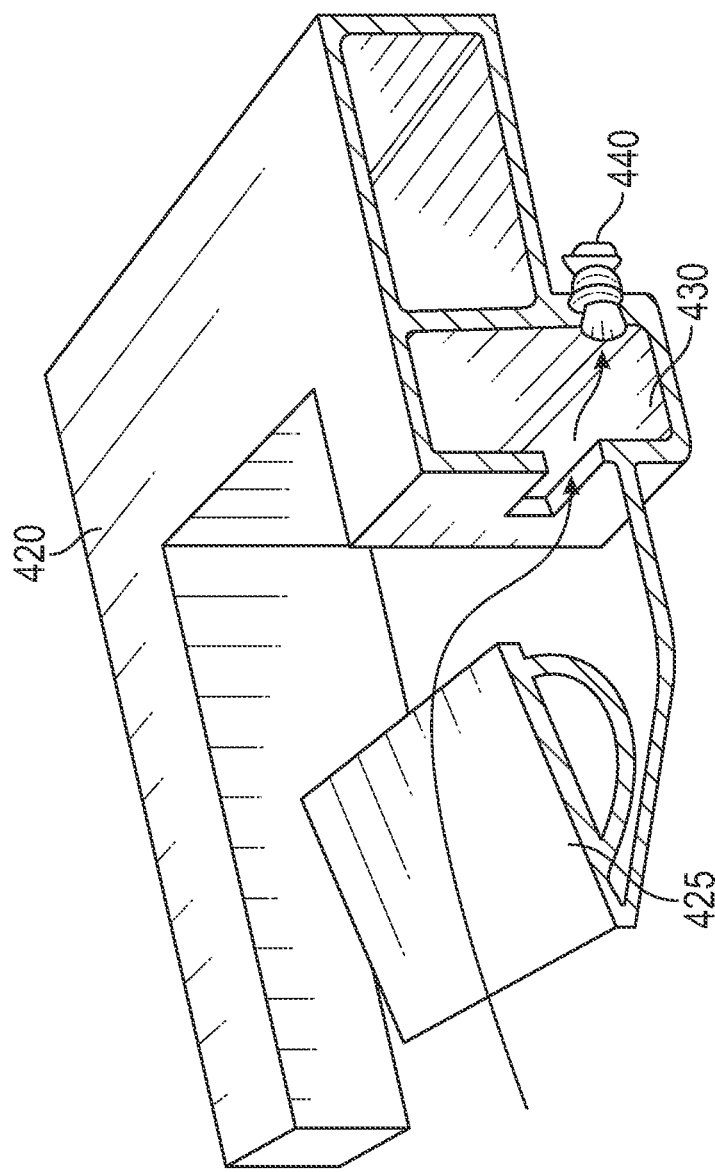
FIG. 4 is cut-away side view of a skimmer device that can be used in the systems of FIGS. 1-2.

FIG. 4 is a cut-away side view of a skimmer device 420. FIG. 4 emphasizes the adjustable weir 425 at a front end (or inlet) of the skimmer device 420, as well as a receptacle 430 for containing debris, which is subsequently removed from the skimmer device in a discharge pipe 440 (partially shown) at a bottom/rear section of the skimmer device.

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A system for removing debris from a water reservoir, the system comprising:
(a) a moveable floating skimmer device positioned within the water reservoir and configured to receive floating debris, the skimmer device comprising an adjustable weir for capturing the debris and a receptacle for containing the debris;
(b) a discharge pipe connected to the skimmer device, the discharge pipe configured to receive the debris and a first portion of water from the receptacle in the skimmer device;
(c) a debris separator fluidly connected to the discharge pipe and configured to receive the debris and the first portion of water from the discharge pipe, the debris separator further configured to separate the debris from the first portion of water;
(d) a pump positioned between the discharge pipe and the debris separator and configured to transport the debris and the first portion of water in the discharge pipe to the debris separator via a pump outlet; and
(e) a recycle line connected to the debris separator and configured to return a second portion of water that exits the debris separator back to the water reservoir.

Aspect 2. The system defined in aspect 1, wherein the skimmer device is configured to float at or near the surface of the water in the reservoir.

Aspect 3. The system defined in aspect 1 or 2, wherein the system further comprises a plurality of tethering lines to control the movement of the skimmer device within the water reservoir.

Aspect 4. The system defined in any one of aspects 1-3, wherein an inlet of the discharge pipe is positioned at a rear section of the skimmer device and fluidly connected to the receptacle in the skimmer device.

Aspect 5. The system defined in any one of aspects 1-4, wherein an inlet of the discharge pipe is positioned at a top section of the skimmer device and fluidly connected to the receptacle in the skimmer device.

Aspect 6. The system defined in any one of aspects 1-5, wherein the system is configured to run periodically or intermittently.

Aspect 7. The system defined in any one of aspects 1-5, wherein the system is configured to run continuously.

Aspect 8. The system defined in any one of aspects 1-7, wherein the debris comprises polymer resin pellets.

Aspect 9. The system defined in any one of aspects 1-8, wherein the debris comprises polymer trash, e.g., polymer flake, fluff, fines, strings, tails, rope, etc.

Aspect 10. The system defined in any one of aspects 1-9, wherein the debris comprises floating organic waste, e.g., leaves, grass, etc.

Aspect 11. The system defined in any one of aspects 1-10, wherein the water reservoir is any suitable contained water source, e.g., a collection pit, a water retention pond or basin, a stormwater reservoir, etc.

Aspect 12. The system defined in any one of aspects 1-11, wherein the water reservoir is not a body of water, e.g., a lake, pond, river, etc., that contains fish.

Aspect 13. The system defined in any one of aspects 1-12, wherein the debris separator comprises any suitable device for separating the debris from the first portion of water, e.g., a rotary screen, a dewatering box, a sieve/screen system (hydrosieve), etc.

Aspect 14. The system defined in any one of aspects 1-13, wherein the debris separator is further configured to separate the debris from the first portion of water using gravity.

Aspect 15. The system defined in any one of aspects 1-14, wherein the system (or the pump) is configured for a water recirculation rate in any suitable range, e.g., from 25 to 250 gpm, from 50 to 200 gpm, from 120 to 200 gpm, etc.

Aspect 16. The system defined in any one of aspects 1-15, wherein the system further comprises a screen surrounding at least a portion of the skimmer device, the screen configured to prevent large debris from entering the skimmer device.

Aspect 17. The system defined in any one of aspects 1-16, wherein the system further comprises a screen surrounding at least a portion of the skimmer device, the screen having an average diameter of screen openings in any suitable range, e.g., from 0.25 to 2 inches, from 0.5 to 1.5 inches, etc.

Aspect 18. The system defined in aspect 16 or 17, wherein the skimmer device is further configured for the debris and water within the water reservoir to flow through the screen and over the adjustable weir.

Aspect 19. The system defined in any one of aspects 1-18, wherein the system further comprises a rinse system configured to rinse debris, e.g., pellets and other debris, into the water reservoir using water from the debris separator.

Aspect 20. The system defined in any one of aspects 1-19, wherein the system further comprises a cleaning system configured to clean screens at a discharge from the water reservoir using water from the debris separator.

Aspect 21. The system defined in any one of aspects 1-20, wherein the system is further configured for the second portion of water in the recycle line, that is returned to the water reservoir, to propel floating debris into the skimmer device.

Aspect 22. The system defined in any one of aspects 1-21, wherein the system further comprises a wash pump configured to pressurize water exiting the debris separator (e.g., to create a wash system).

Aspect 23. The system defined in aspect 22, wherein the wash pump operates intermittently or continuously.

Aspect 24. The system defined in aspect 22 or 23, wherein the wash pump has any suitable output pressure, e.g., from 2 to 50 psig, from 5 to 20 psig, etc.

We claim:

1. A system for removing debris from a water reservoir, the system comprising:
   (a) a moveable floating skimmer device positioned within the water reservoir and configured to receive floating debris, the skimmer device comprising an adjustable weir for capturing the debris and a receptacle for containing the debris, wherein a screen surrounds at least a portion of the skimmer device, the screen configured to prevent large debris from entering the skimmer device and having an average diameter of screen openings in a range from 0.25 to 2 inches;

(b) a discharge pipe connected to the skimmer device, the discharge pipe configured to receive the debris and a first portion of water from the receptacle in the skimmer device;

(c) a debris separator fluidly connected to the discharge pipe and configured to receive the debris and the first portion of water from the discharge pipe, the debris separator further configured to separate the debris from the first portion of water;

(d) a pump positioned between the discharge pipe and the debris separator and configured to transport the debris and the first portion of water in the discharge pipe to the debris separator via a pump outlet;

(e) a recycle line connected to the debris separator and configured to return a second portion of water that exits the debris separator back to the water reservoir; and, (f) a rinse system configured to rinse debris into the water reservoir using water from the debris separator; and wherein the water reservoir is not a body of water that contains fish.

2. The system of claim 1, wherein an inlet of the discharge pipe is positioned at a rear section of the skimmer device and fluidly connected to the receptacle in the skimmer device.

3. The system of claim 1, wherein an inlet of the discharge pipe is positioned at a top section of the skimmer device and fluidly connected to the receptacle in the skimmer device.

4. The system of claim 1, wherein the system is configured to run continuously.

5. The system of claim 1, wherein the floating debris comprises polymer resin pellets.

6. The system of claim 1, wherein the floating debris comprises polymer trash and/or floating organic waste.

7. The system of claim 1, wherein the water reservoir is a collection pit, a water retention pond or basin, or a stormwater reservoir.

8. The system of claim 1, wherein the debris separator comprises a dewatering box.

9. The system of claim 1, wherein the debris separator comprises a hydrosieve.

10. The system of claim 1, wherein the debris separator is further configured to separate the debris from the first portion of water using gravity.

11. The system of claim 1, wherein the system is configured for a water recirculation rate of the first portion of the water in a range from 25 to 250 gpm.

12. The system of claim 1, wherein the system is further configured for the second portion of water in the recycle line, that is returned to the water reservoir, to propel the floating debris into the skimmer device.

13. The system of claim 1, wherein the system further comprises a plurality of tethering lines to control movement of the skimmer device within the water reservoir.

14. A system for removing debris from a water reservoir, the system comprising:

(a) a moveable floating skimmer device positioned within the water reservoir and configured to receive floating debris, the skimmer device comprising an adjustable weir for capturing the debris and a receptacle for containing the debris;

(b) a discharge pipe connected to the skimmer device, the discharge pipe configured to receive the debris and a first portion of water from the receptacle in the skimmer device;

(c) a debris separator fluidly connected to the discharge pipe and configured to receive the debris and the first portion of water from the discharge pipe, the debris separator further configured to separate the debris from the first portion of water;

(d) a pump positioned between the discharge pipe and the debris separator and configured to transport the debris and the first portion of water in the discharge pipe to the debris separator via a pump outlet; and (e) a recycle line connected to the debris separator and configured to return a second portion of water that exits the debris separator back to the water reservoir; and, (f) a rinse system configured to rinse debris into the water reservoir using water from the debris separator; and wherein the system is configured for a water recirculation rate of the first portion of the water in a range from 25 to 250 gpm.

15. The system of claim 14, wherein an inlet of the discharge pipe is positioned at a rear section of the skimmer device and fluidly connected to the receptacle in the skimmer device.

16. The system of claim 14, wherein an inlet of the discharge pipe is positioned at a top section of the skimmer device and fluidly connected to the receptacle in the skimmer device.

17. The system of claim 14, wherein the floating debris comprises polymer resin pellets.

18. The system of claim 14, wherein the water reservoir is a collection pit, a water retention pond or basin, or a stormwater reservoir.

19. The system of claim 14, wherein the water reservoir is not a body of water that contains fish.

20. The system of claim 14, wherein a screen surrounds at least a portion of the skimmer device, the screen configured to prevent large debris from entering the skimmer device and having an average diameter of screen openings in a range from 0.25 to 2 inches.

* * * * *